United States Statutory Invention Registration [19]

[11] Reg. Number: H209

Oakley [43] Published: Feb. 3, 1987

[54] DIFFERENTIAL PRESSURE PIN DISCHARGE APPARATUS

[75] Inventor: David J. Oakley, Richland, Wash.

[73] Assignee: The United States of America as represented by the United States Department of Energy, Washington, D.C.

[21] Appl. No.: 615,432

[22] Filed: May 30, 1984

[51] Int. Cl.[4] ..... G21C 19/02; F16J 15/32; F16J 15/40; F16J 15/48

[52] U.S. Cl. ..... 376/261; 277/3; 277/27; 277/212 FB

[58] Field of Search ..... 376/261, 265, 266; 137/846, 850; 277/3, 27, 212 FB, 212 R

[56] References Cited

U.S. PATENT DOCUMENTS

| | | | |
|---|---|---|---|
| 3,822,720 | 7/1974 | Souza | 137/846 |
| 4,135,550 | 1/1979 | Andersson | 137/565 |
| 4,548,347 | 10/1985 | Christensen et al. | 228/48 |

*Primary Examiner*—John F. Terapane
*Assistant Examiner*—Eric Jorgensen
*Attorney, Agent, or Firm*—Robert Southworth, III; Judson R. Hightower

[57] ABSTRACT

Disclosed is a discharge assembly for allowing elongate pins to be discharged from an area of relatively low pressure to an area of relatively greater pressure. The discharge assembly includes a duck valve having a lip piece made of flexible material. The flexible lip piece responds to a fluctuating pressure created downstream by an aspirator. The aspirator reduces the downstream pressure sensed by the duck valve when the discharge assembly is in the open position. This allows elongate pins to be moved through the duck valve with no backflow because the aspirator pressure is less than the pressure in the low pressure area from which the pins originate. Closure of the assembly causes the aspirator static pressure to force the flexible duck valve lip piece into a tightly sealed position also preventing backflow. The discharge assembly can be easily controlled using a single control valve which blocks the flow of aspirator gas and closes the pin passageway extending through the assembly.

5 Claims, 11 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG 4
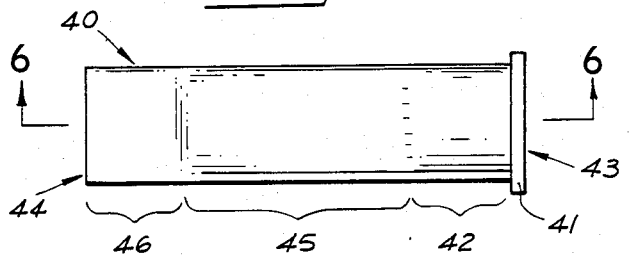
FIG 5
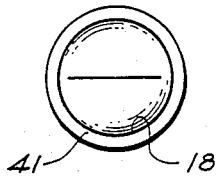
FIG 7
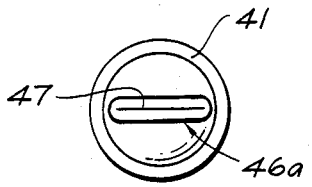
FIG 6
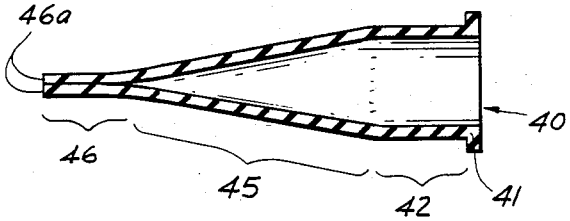
FIG 9
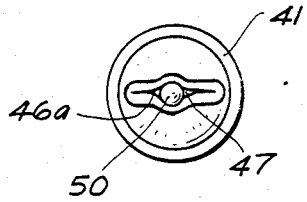
FIG 8
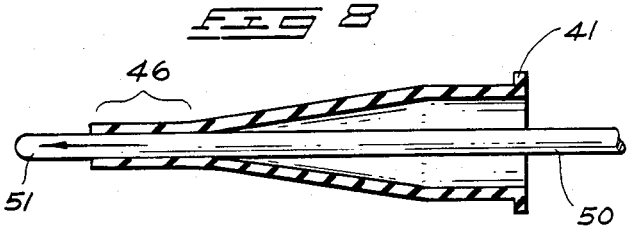
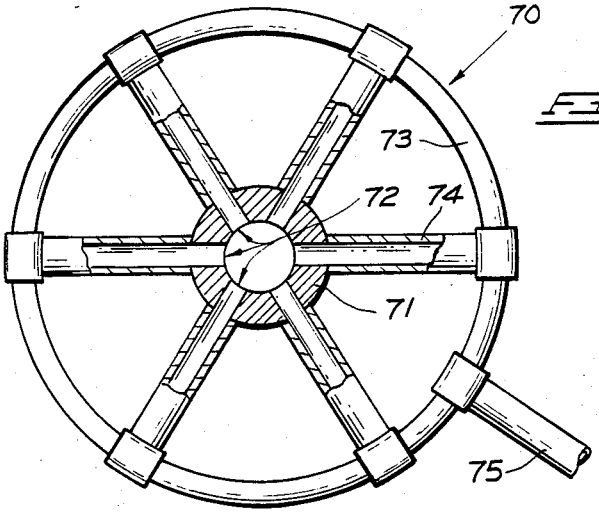
FIG 10

DIFFERENTIAL PRESSURE PIN DISCHARGE APPARATUS

The United States Government has rights in this invention pursuant to Contract No. DE-AC06-76FF02170 between the U.S. Department of Energy and Westinghouse Hanford Co.

TECHNICAL FIELD

The technical field of this invention includes apparatus for discharging elongate pins from an area having a relatively low pressure to another area having relatively higher pressure, while minimizing leakage between the areas of differential pressure.

BACKGROUND OF THE INVENTION

In the production of nuclear fuel pins it is desirable to automatically assemble, clean and inspect the fuel pins within an automated fabrication system contained within an airtight enclosure. The airtight fabrication enclosure is preferably operated at a negative pressure of approximately 1 inch water column. Such a nuclear fuel pin fabrication system also uses an approximately pure helium atmosphere which must be maintained in a pure state even though finished fuel pins are intermittently being discharged from the system as finished product.

It is an object of this invention to provide a pin discharge assembly which allows elongate pins to be discharged from a fabrication system operating at below ambient conditions with a minimum of gas inflow into the fabrication system.

It is also an object of the invention to provide a pin discharge assembly which allows gases which may be emitted during discharge of an elongate pin to be contained and safely disposed of without emission into the area into which the elongate pin is being discharged.

It is a further object of the invention to provide a pin discharge assembly which is easy to manufacture and to maintain.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

A preferred embodiment of this invention is illustrated in the accompanying drawings, in which:

FIG. 4 is an enlarged top view of the duck valve lip piece included in the assembly of FIG. 1;

FIG. 5 is an end view of the upstream end of the duck valve lip piece shown in FIG. 4;

FIG. 6 is a longitudinal sectional view taken along line 6—6 of FIG. 4;

FIG. 7 is a downstream end view of the duck valve lip piece shown in FIG. 6;

FIG. 8 is a longitudinal sectional view as shown in FIG. 6 and also showing an elongate pin passing therethrough;

FIG. 9 is a downstream end view of the combination shown in FIG. 8; and

FIG. 10 is a cross-sectional view, on an enlarged scale, taken along line 10—10 of FIG. 1.

DETAILED DESCRIPTION OF THE PREFERRED EMBODIMENT

Figures 1A, 1B:
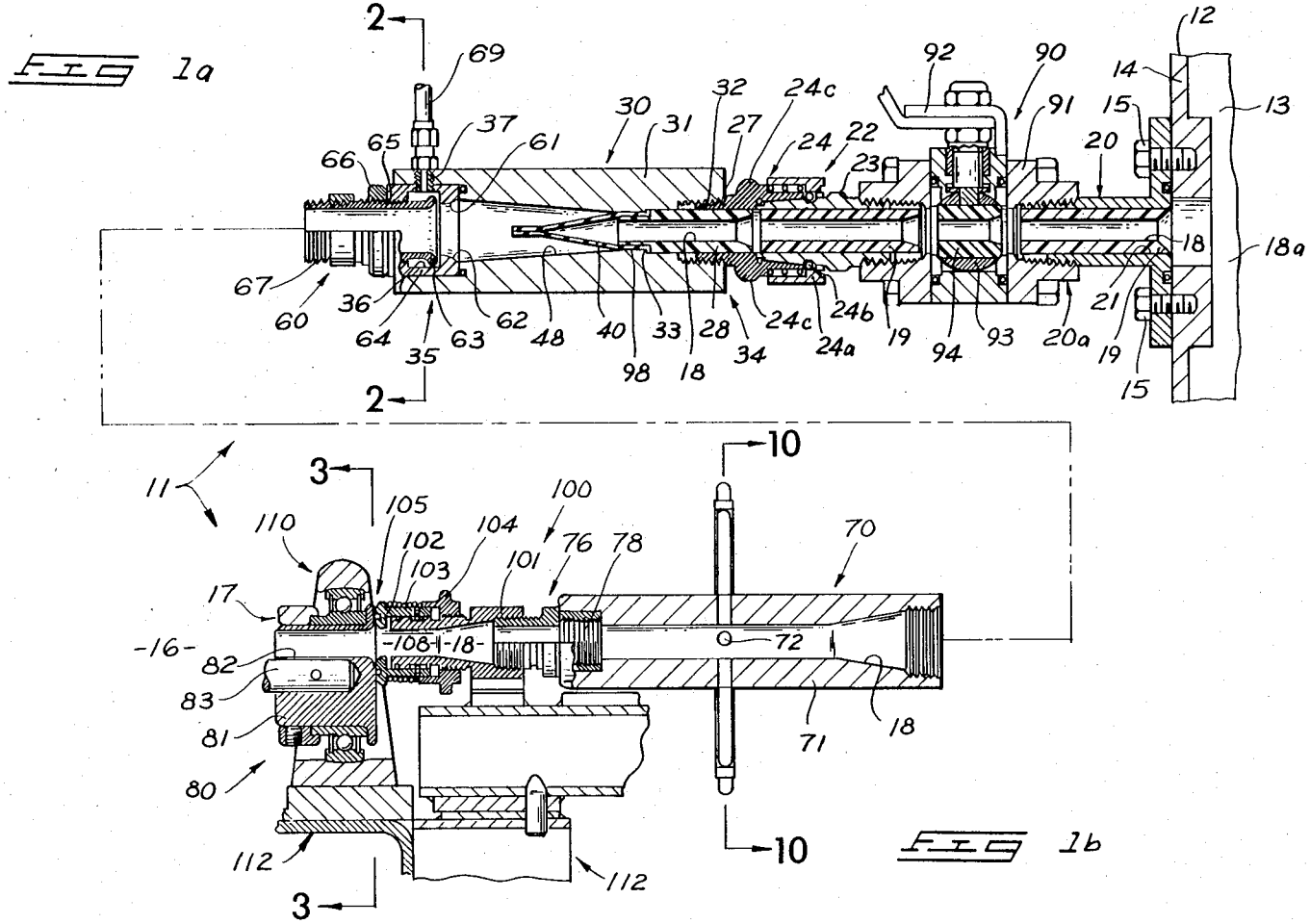
FIGS. 1A and 1B constitute a composite longitudinal sectional view of a pin discharge assembly constructed in accordance with this invention.
Figure 2:
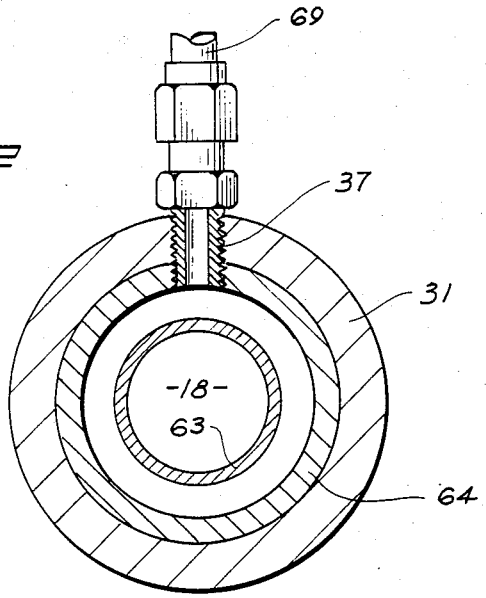
FIG. 2 is an enlarged cross-sectional view taken along line 2—2 of FIG. 1.

FIG. 1 shows a longitudinal sectional view of a preferred pin discharge assembly according to this invention. The pin discharge assembly 11 is connected to a source containment vessel 12 which defines a source area, part of which is indicated by the reference numeral 13. Source area 13 is maintained at a source pressure which is typically less than the ambient or terminal pressure existing in terminal areas 16 surrounding the outlet 17 of the pin discharge assembly.

The lower pressure in the source area 13 as compared to the terminal pressure in the terminal area 16 tends to create a backflow of gases from terminal area 16 into the source area 13 unless somehow restricted.

The pin discharge assembly shown in FIG. 1 preferably includes a containment vessel fitting 20 which is bolted to wall 14 of the containment vessel using bolts 15. Containment vessel fitting 20 has an interior bore 21. An antifriction insert 19 is preferably fitted within the bore 21 to reduce friction between the fitting and elongate pins (shown in FIGS. 8 and 9) which pass through a pin passageway 18 which extends through insert 19 and beyond the containment vessel fitting 20.

A commercially available ball valve 90 is advantageously connected at the downstream end **20*a* of containment vessel fitting 20. Ball valve 90 continues pin passageway 18 therethrough so as to allow elongate pins 50 (see FIGS. 8 and 9) to be passed therethrough. Ball valve 90 includes a ball valve body 91, handle 92, ball 93, and nylon or other antifriction insert 94**.

Although not necessary, it is desirable to include a quick connect assembly 22 between ball valve 90, if included, or containment vessel fitting 20 and duck valve 30. Quick connect assembly 22 is preferably a commercially available quick connect assembly having a plug portion 23 and socket portion 24. Socket portion 24 includes a detachment sleeve **24*a*, retaining balls 24*b*, and socket body 24*c*. Hansen brand quick connect socket Model No. LL6-S30 and quick connect plug Model No. LL6-T30 are preferred models for this quick connect assembly 22**, although many others are alternatively operable.

The quick connect assembly 22 is preferably lined by an antifriction insert 19 which extends through plug 23 and defines pin passageway 18. A second antifriction insert 28 advantageously extends within quick connect socket 24 and also further defines pin passageway 18 therethrough.

Duck valve 30 is a key component of the pin discharge assembly 11. It is used to prevent backflow and reduce forward flow of gases through the discharge assembly. Duck valve 30 includes a duck valve body 31 which acts as the main structural component of the valve. Duck valve body 31 preferably includes a threaded aperture 32 which can advantageously be used to receive threaded portion 27 of quick connect socket body **24*c***.

A duck valve passageway 98 extends through duck valve body 31 and is shaped with a shoulder 33 toward the upstream end 34 of the duck valve. Shoulder 33 is provided to restrain duck valve lip piece 40 against possible longitudinal motion within pin passageway 18. Shoulder 33 prevents lip piece 40 from moving toward the downstream end 35 of duck valve body 31. Antifriction insert 28 extends inside of lip piece 40 to help guide fuel pins therethrough and prevents the lip piece from moving toward the upstream end 34 of the duck valve body.

Duck valve passageway 98 is preferably cylindrical immediately downstream from shoulder 33 in order to better conform to the barrel section 42 of lip piece 40. Thereafter the duck valve passageway 98 diverges toward the downstream end 35, surrounding the tapered section 45 and sealing lip section 46 of lip piece 40. Duck valve passageway 98 preferably is sized to approximate the size of inlet 61 of aspirator means 60 adjacent thereto near the downstream end.

Pin passageway 18 also extends through duck valve 30 and communicates in a linear fashion with the related pin passageways 18 in other parts of the pin discharge assembly 11. Pin passageway 18 is defined within duck valve 30 by antifriction insert 28, lip piece 40, and duck valve passageway 98.

FIGS. 4 through 9 further illustrate the shape and operation of lip piece 40. FIG. 4 shows lip piece 40 viewed from the top. Lip piece 40 preferably includes a flange 41 which bears against shoulder 33 of duck valve passageway 98. Pin passageway 18 extends through the interior of lip 40. A barrel section 42 is approximately cylindrical and extends from flange 41 at upstream end 43 toward the downstream end 44. A tapered section 45 extends downstream from barrel section 42 to the sealing lip section 46. Sealing lip section 46 has flexible sealing lip means **46*a* which define and close about a lip opening 47 extending approximately across the downstream end 44 of the lip piece 40. Sealing lip means 46*a* separate as shown in FIGS. 8 and 9 thereby forming a higher lip opening 47 which allows passage of elongate pin 50** therethrough.

The downstream end 35 of duck valve 30 includes an aspirator receiving hole 36 for receiving an aspirator means 60 therein. A threaded aspirator gas supply port 37 is preferably machined into the top of duck valve 30 to allow pressurized gas to be supplied to aspirator means 60.

Aspirator 60 continues pin passageway 18 therethrough to allow elongate pins 50 to be discharged therethrough. Aspirator 60 can advantageously be a commercially made aspirator such as Beck brand Ring Jet Air Mover Model R-0200. Aspirator means 60 preferably includes a converging inlet 62 which extends downstream from inlet opening 61. An adjustable venturi sleeve 63 is adjustably mounted within an aspirator body 64, preferably using a threaded connection 65 therebetween. Jam ring 66 is used to secure the relative positions of venturi sleeve 63 and aspirator body 64.

Aspirator 60 can advantageously be provided with a threaded downstream end 67 which mates into an evacuator means 70. Other types of end fittings can alternatively be used.

Evacuation means 70 preferably includes an evacuation means body 71 which has a pin passageway 18 extending therethrough to linearly communicate with pin passageway 18 extending through fitting 20, ball valve 30, quick connect assembly 22, duck valve 30 and aspirator means 60. Evacuation means 70 preferably includes a plurality of evacuation ports 72 which are preferably positioned about pin passageway 18 at approximately equal angular intervals. FIG. 10 shows preferred form of orientation for the evacuation ports 72 wherein the ports are mounted every 60 degrees.

Evacuation means 70 is provided to withdraw gases which are present therein during discharge of elongate pins 50. The evacuation means includes not only the body 71 but also an evacuation means connection ring 73. Radial connection lines 74 extend between connection ring 73 and the evacuation ports 72. Connection ring 73 is also connected to a vacuum system through a vacumm supply line 75.

The downstream end 76 of evacuation means 70 is preferably connected into a mechanical seal assembly 100. Mechanical seal assembly 100 includes a mounting piece 101 and a contact piece 102 slidably mounted thereon. A biasing spring 103 is positioned between the contact piece 102 and adjustable backstop 104 in order to bias the contact piece 105 against a control valve disk 81.

Figure 3:
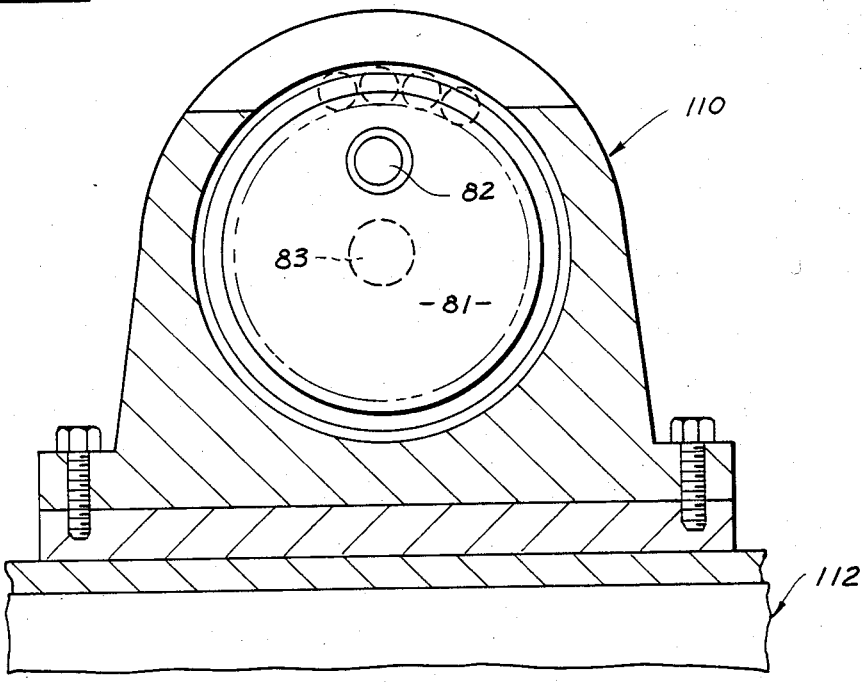
FIG. 3 is an enlarged end and cross-sectional view of a control valve taken along line 3—3 of FIG. 1.

A control valve 80 is positioned at the downstream end of mechanical seal assembly 100. FIG. 3 shows an end and cross-sectional view taken along 3—3 of FIG. 1. Control valve 80 is preferably a circular valve disk 81 having a pin passage port 82 formed therein. The circular valve disk 81 is rotatably mounted in bearing pillow block 110. Disk 81 rotates as a result of torque applied through shaft 83. The pillow block 110 is mounted on support frame 112 which also supports mounting piece 101 of mechanical seal assembly 100.

There are two modes of operation for control valve 80. The first mode of operation is when the pin passage port 82 is aligned with pin passageway 18 near the exit of mechanical seal assembly 100. In this first or open mode of operation the circular valve disk is positioned so that an elongate pin 50 can pass through the entire discharge assembly including the pin passage port 82. In the first mode of operation the pin passage port 82 also allows gas flowing through the aspirator 60 to flow from the pin passageway 18 into the terminal area 16 as will be more fully described below. The second or closed mode of operation of the control valve 80 is when the pin passage port 82 is rotated away from passageway 18 thereby closing the outlet 108 of mechanical seal assembly 100.

The pin discharge assembly of this invention is used by connecting it into any appropriate system wherein elongate pins are to be discharged from a source area into a terminal area and where the pressure existing within the source area is lower than that existing in the terminal area.

Operation of the pin discharge assembly is commenced by first arranging the various components preferably as shown in FIG. 1 or some equivalent thereto. Pressurized gas such as air or helium is supplied to aspirator 60 through supply line 69 and aspirator supply port 37. Control valve 80 is positioned in the closed mode when elongate pins 50 are not exiting through the discharge assembly. Pin passageway 18 is thus sealed against passage of elongate pins 50 and also against leakage of the pressurized aspirator gas supplied through supply line 69. The aspirator gas in line 69 is preferably in the range of approximately 15 lbs. per square inch gauge pressure. This must be compared against the assumed ambient or terminal area pressure of zero pounds per square inch gauge and the source area pressure of approximately one inch of water column vacuum.

The incoming pressurized aspirator gas blocked by control valve 80 pressurizes the pin passageway downstream of lip piece 40 to a blocked aspirator pressure. The soft flexible material from which lip piece 40 is contructed allows the sealing lip section 46 to seal against leakage of gases. The relatively high pressure supplied by line 69 forces the outsides of lip piece 40 inwardly thereby causing the sealing lip section 46 to collapse and seal tightly thereby preventing backflow of aspirator gas or terminal area atmosphere into source area 13.

When an elongate pin 50 is to be discharged through assembly 11, then the pin is positioned adjacent to entrance 18*a* of pin passageway 18 and moved longitudinally thereinto. Control valve 80 is opened before the downstream end 51 (see FIG. 8) of pin 50 reached lip piece 40. Opening of control valve 80 causes compressed aspirator gas to rush through aspirator means 60 thereby reducing the pressure downstream of the lip piece due to the venturi effect. The resulting aspirator venturi pressure existing in the downstream end of duck valve 30 drops below the one inch water column vacuum existing within source area 13. An approximate range of vacuum pressures produced by aspirator 60 in the discharge end of duck valve 30 is two to four inches water column vacuum. The slightly greater vacuum existing in the downstream end of duck valve 30 causes the soft flexible sealing lips 46*a* of lip piece 40 to slightly separate at lip opening 47 such as shown in FIGS. 8 and 9. The elongate pin 50 can then very easily slide through the duck valve without substantial friction developing between lip piece 40 and pin 50. Lip opening 47 approximately conforms to the shape of the transiting pin 50 as it progresses therethrough to reduce the amount of leakage occurring from source area 13 to the downstream side of lip piece 40.

Once the elongate pin has traversed completely through pin passageway 18, the control valve 80 is rotated into the closed positions thereby blocking the exit end 108 of pin passageway 18. Again the static pressure of the incoming aspirator gas supply returns to close the duck valve 30 by compressing sealing lips 46 together.

This cycle is repeated for each elongate member which passes from the source area 13 to terminal area 16. The pin discharge assembly 11 has the substantial advantage of allowing control valve 80 to automatically operate the duck valve without further control means being necessary. Opening of control valve 80 also automatically activates aspirator means 60.

Evacuation means 70 is advantageously provided to remove leakage which may flow from source area 13 during discharge of an elongate pin. Evacuation means 70 is connected to a source of vacuum which is greater in vacuum then pressure existing within pin passageway 18 at the point where the evacuation ports 72 are provided. Varying the degree of vacuum provided by evacuation means 70 allow either small or relatively large amounts of the gas flowing through pin passageway 18 to be drawn off for treatment and subsequent disposal in case there are any contaminants flowing from source area 13.

The pin discharge assembly 11 is constructed according to well known manufacturing techniques in accordance with the description given herein. Most parts can be constructed from a variety of possible metals. Sealing parts can be made from a variety of elastomeric materials. The inserts lining pin passageway 18 are preferably made from nylon or some other material having low friction when the elongate pins are forced therealong. The sealing lip piece 40 is preferably constructed from a relatively thin latex material such as commonly used in the manufacture of household rubber gloves.

This description of a preferred embodiment of the invention has been presented for purposes of illustration and example. It is not intended to be exhaustive or to limit the invention to the precise form disclosed. It is intended that the scope of the invention be defined by the following claims.

I claim:

1. A pin discharge assembly for allowing elongate pins to be discharged from a source area having a source pressure, into a terminal area having a terminal pressure which is greater than the source pressure; comprising:

a valve having a pin passageway therethrough the conveying elongate pins being discharged from the source area; the valve having flexible lip means having a duck bill shape and extending across the pin passageway and having a lip opening therethrough for conveying pins therethrough; the flexible lip means being collapsible to prevent backflow of gases into the source area;

aspirator means connected downstream of the valve and having a pin passageway therethrough for communicating with the pin passageway in the valve to allow elongate pins to pass through the aspirator means; the aspirator means serving to intermittently produce an aspirator venturi pressure downstream of the flexible lip means which is less than the source pressure.

2. The pin discharge assembly of claim 1 further comprising a control valve mounted downstream of the aspirator means and adjustable between closed and open positions; the closed position blocking the pin passageway thereby causing an aspirator static pressure to exist downstream of the lip means to tightly seal the valve lip means and prevent backflow into the source area; the open position allowing elongated pins to pass through a pin passage port in the control valve and also cause fluid flow through the aspirator to reduce pressure downstream of the flexible lip means for easier passage of elongate pins therethrough.

3. The pin discharge assembly of claim 2 further comprising evacuation means operatively connected to the pin passageway downstream of the aspirator to remove fluid flowing from the source area through the pin passageway.

4. The pin discharge assembly of claim 2 further comprising a mechanical seal assembly having a pin passageway therethrough positioned upstream from the control valves to prevent leakage.

5. A pin discharge assembly for allowing elongate pins to be discharged from a source area having a source pressure, to a terminal area having a terminal pressure which is greater than the source pressure, comprising:

a valve having an upstream end, downstream end, and a pin passageway therethrough for allowing elongate pins to be conveyed from the source area through the valve; the valve having flexible lip means extending across the pin passageway and having a lip opening for allowing pins to be conveyed therethrough; the lip means being operative to open positions by creating a pressure downstream of the lip means which is less then the source pressure upstream of the valve;

aspirator means connected downstream of the valve and having a pin passageway therethrough for communicating with the pin passageway in the valve, to allow elongate pins to pass through the aspirator means; the aspirator means serving to produce an aspirator venturi pressure downstream of the flexible lip means which is less than the source pressure when pins are being conveyed or an aspirator static pressure which is greater than the source pressure when the discharge assembly is closed and awaiting discharge of another pin;

a control valve means mounted downstream of the aspirator means to block the pin passageway and close the discharge assembly to prevent flow of aspiration gas through the aspirator means thereby automatically controlling said valve and aspirator means.

* * * * *